(12) United States Patent  
Raskar

(10) Patent No.: US 6,741,248 B2  
(45) Date of Patent: May 25, 2004

(54) RENDERING GEOMETRIC FEATURES OF SCENES AND MODELS BY INDIVIDUAL POLYGONS

(75) Inventor: Ramesh Raskar, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 570 days.

(21) Appl. No.: 09/826,332

(22) Filed: Apr. 4, 2001

(65) Prior Publication Data

US 2002/0145605 A1 Oct. 10, 2002

(51) Int. Cl.$^7$ .............................................. G06T 15/40
(52) U.S. Cl. ........................................ 345/422; 345/420
(58) Field of Search ................................. 345/419, 420, 345/422, 428

(56) References Cited

U.S. PATENT DOCUMENTS 5,359,704 A   10/1994   Rossignac et al. .......... 395/122

OTHER PUBLICATIONS

Raskar et al., "Image Precision Silhouette Edges", Interactive 3D Graphics Symposium, 1999, pp. 1–9.*
Raskar et al., "Image Precision Silhouette Edges", Symposium on Interactive 3D Graphics, 1999.

* cited by examiner

Primary Examiner—Mark Zimmerman
Assistant Examiner—Lance W. Sealey
(74) Attorney, Agent, or Firm—Dirk Brinkman; Andrew Curtin

(57) ABSTRACT

A method renders a mesh constructed of polygons representing a graphics model one at the time to accentuate geometric features of the mesh. At least one additional polygon is generated at each edge of each polygon of the mesh. Each additional polygon has a predetermined orientation, size, and color. The predetermined orientation of the generated polygons is 180° with respect to the polygon if the polygon is a back-facing polygon to accentuate silhouettes. The predetermined orientation of the generated polygon is a first threshold angle with respect to the polygon if the polygon is a front-facing polygon to accentuate ridges, and the predetermined orientation of the generated polygon is a second threshold angle with respect to the polygon if the polygon is a front-facing polygon to accentuate valleys.

11 Claims, 6 Drawing Sheets

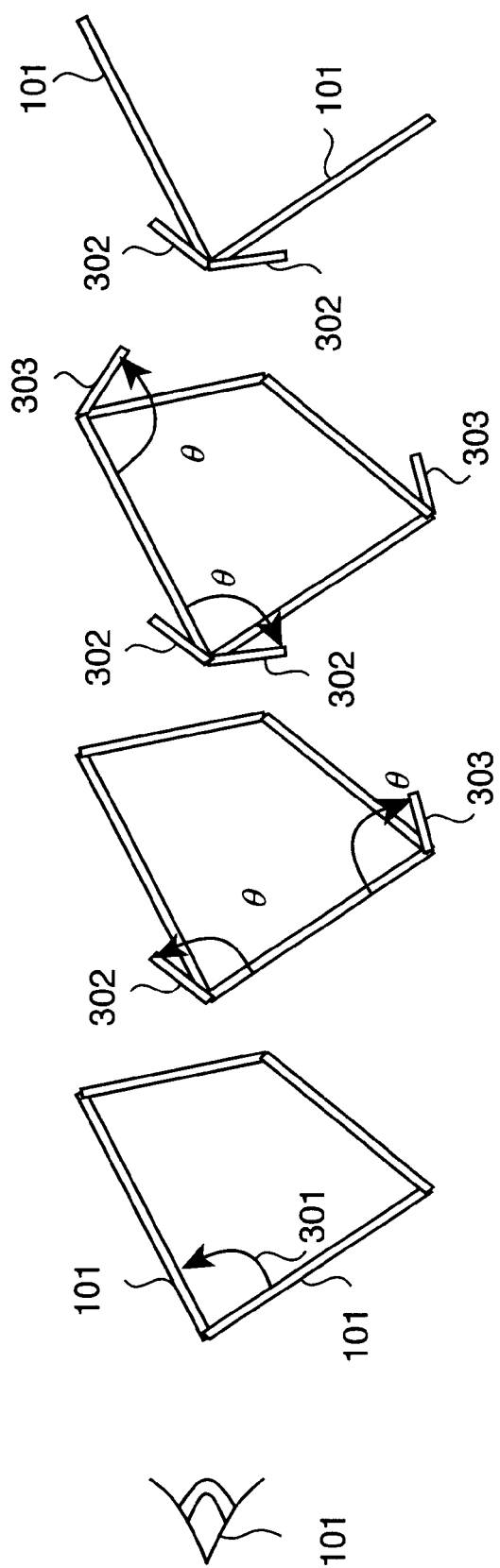

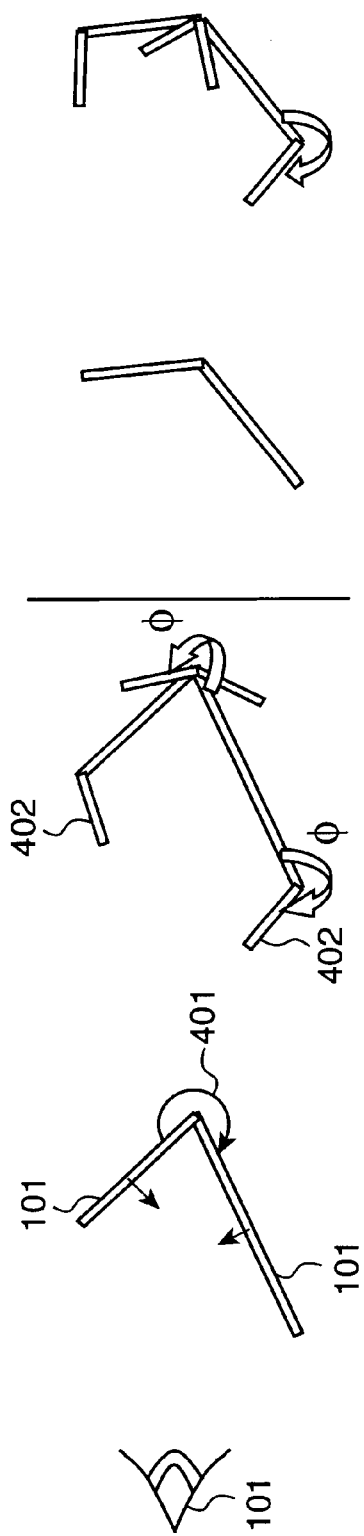
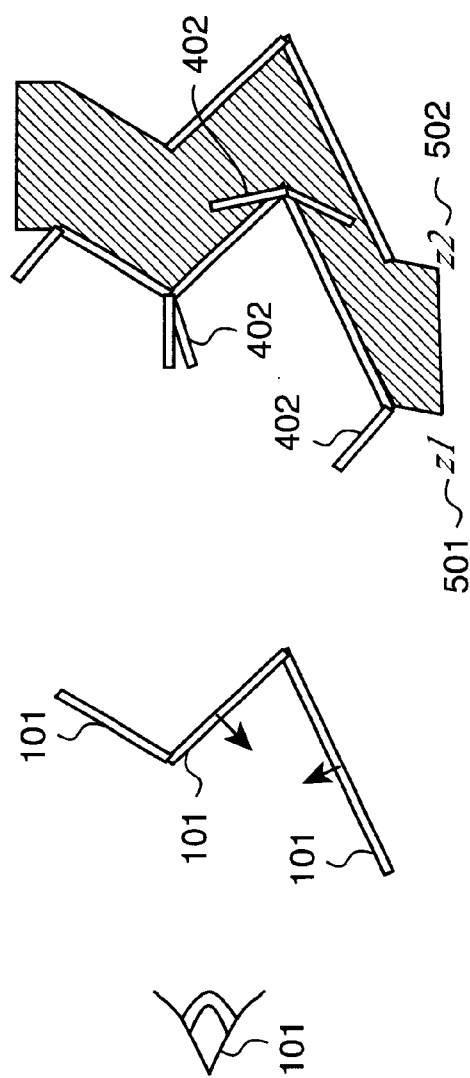
FIG. 4a FIG. 4b FIG. 4c FIG. 4d
FIG. 5a FIG. 5b

RENDERING GEOMETRIC FEATURES OF SCENES AND MODELS BY INDIVIDUAL POLYGONS

FIELD OF THE INVENTION

The invention relates generally to the field of rendering scenes and objects with polygons, and more particularly to rendering geometric edge features of the scenes and objects with polygons.

BACKGROUND OF THE INVENTION

Scenes and graphics models are frequently rendered as images using polygon meshes. Polygon meshes often include geometric edge features such as silhouettes, ridges, valleys, and intersections A silhouette edge of a polygon connects a back-facing polygon to a front-facing polygon. A ridge edge connects two adjacent polygons disposed at angle that is less than a ridge threshold angle. For a valley edge, the angle of the two adjacent polygons is greater than a valley threshold angle. An intersection edge is common to an interior portion of two intersecting polygons.

When these particular edges are accentuated in the images, they can convey a great deal of information to the viewer. In static images, such as, technical illustrations, engineering CAD diagrams, and non-photo-realistic renderings, accentuated features enhance the appearance of the underlying graphics models.

A number of rendering methods that consider these special geometric features are know in the prior art. Techniques for rendering features of polygonal scenes are described by Gooch et al., "Interactive Technical Illustration," Symp. on Interactive 3D Graphics, 1999, and Markosian et al. "Real-Time Non-photo realistic Rendering," Computer Graphics, Proceedings of SIGGRAPH '97, August, 1997.

Raskar, "Image Precision Silhouette Edges," Interactive 3D Graphics Symposium, 1999, and Rossignac et al. "Hidden Contours on a Framebuffer," Proceedings of the 7$^{th}$ Workshop on Computer Graphics Hardware, Eurographics, 1992, described techniques for rendering silhouettes that required two rendering passes. Furthermore, their edge enhancement was based on non-realistic, substantially orthographic projection, and not exact and correct perspective projection. Moreover, Rossignac et al., required multiple depth and frame buffers during scan conversion, and a mix of line and polygon renderings techniques.

When adjacency information for the polygons is available, identifying sharp edges is relatively simple for static models. In one traditional approach, a scene graph or list is traversed for each polygon edge to determine the relationship between adjacent polygons and identify the special features. Then, the features can be rendered using a visibility process.

When adjacency information is not available, identifying special features requires random traversals of the scene graph or list to locate adjacent polygons. Generating and maintaining an adjacency matrix, and traversing it increases processing time and memory requirements. Hence, such operations are usually performed by software. This task becomes even more difficult for dynamic scenes. This is the primary reason why geometric feature enhancement is not used during most dynamic visualizations.

Even if adjacency information is available, most commonly used hardware and software rendering engines cannot use the information. Rendering hardware preferably operates, in parallel, on relatively small sets of triangles, one set at the time, and all the information necessary for rendering must be contained in the individual triangles of the sets. Ideally, a rendering pipeline processes each polygon without having to use information about other polygons.

A secondary problem with explicit edge rendering as lines is that typical polygon raster scan conversion pipelines are less efficient when 2D or 3D lines are displayed. This is because the raster lines are filled to a uniform width in a screen coordinate system that is different that the coordinate system used for the polygons.

Also, silhouette edges are view-dependent and must be determined for each frame. In contrast, ridges and valleys are view independent, and hence, fixed under rigid transformations. For example, whether a polygon is front-facing or back-facing, with respect to a point or directional light source, is view-independent during lighting calculations. However, for most hardware pipelined rendering operations, it is just simpler to compute and render the edges in frame, without using coherence information from previous frames. And, for software rendering engines, it is usually easier to generalize, and just compute a corresponding dot product for each frame.

Therefore, there is a need for a method that can directly identify special features in a frame buffer. Then, the special features can still be displayed while rendering the polygons one at the time with traditional rendering engines that would otherwise need connectivity information. Furthermore, the method should perform feature identification operations without the use of other rendering operations such as lighting. Furthermore, the method should operate correctly with realistic perspective rendering techniques.

SUMMARY OF THE INVENTION

The present invention enables the rendering of special features of a scene or graphics model, such as silhouettes, ridges, valleys, and intersections by rendering engines that process one individual polygon at the time. The invention determines the special features using only local calculations, and does not depend on a polygon mesh being closed or open, concave or convex, or having cusps.

More specifically, the invention provides a method for rendering a mesh constructed of polygons, the mesh representing a graphics model. The polygons are processed one at the time to accentuate geometric features of the mesh. At least one additional polygon is generated at each edge of each polygon of the mesh. Each additional polygon has a predetermined orientation, size, and color. The predetermined orientation of the generated polygons is 180° with respect to the polygon if the polygon is a back-facing polygon to accentuate silhouettes. The predetermined orientation of the generated polygon is a first threshold angle with respect to the polygon if the polygon is a front-facing polygon to accentuate ridges, and the predetermined orientation of the generated polygon is a second threshold angle with respect to the polygon if the polygon is a front-facing polygon to accentuate valleys.

BRIEF DESCRIPTION OF THE DRAWINGS

FIGS. 3a–d are side views of front-facing polygons with a common ridge edge;

FIGS. 4a–d are side views of front-facing polygons with a common valley edge;

FIGS. 5a–b, and 6 are side views of intersecting polygons and depth buffers.

DETAILED DESCRIPTION OF THE PREFERRED EMBODIMENTS

My invention identifies special geometric features, such as silhouettes, ridges, valleys, and intersections, in polygon meshes of scenes and graphics models. In the description below and the figures, the polygons are generally shown orthogonal to the viewing direction.

Figure 1B:
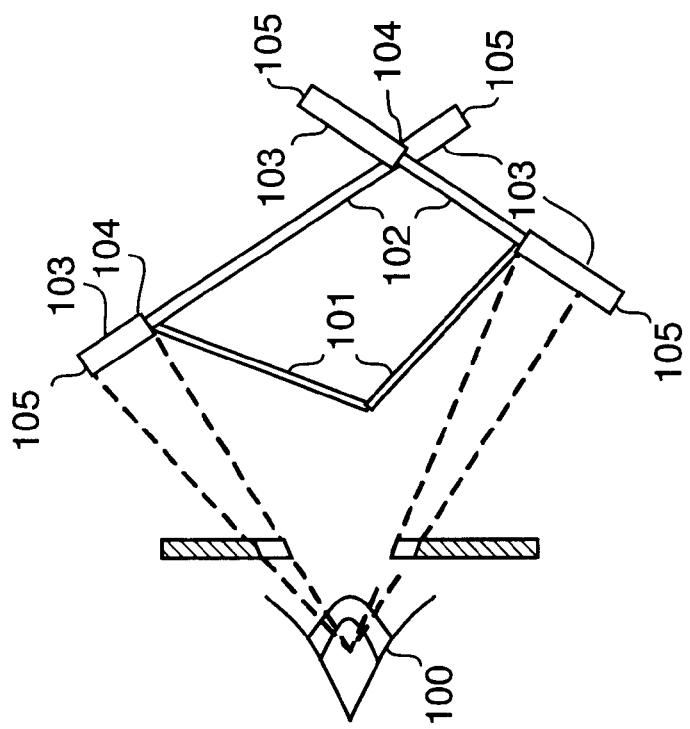
FIG. 1*b* is a side view of back-facing polygons having edges to be accentuated.
Figure 1A:
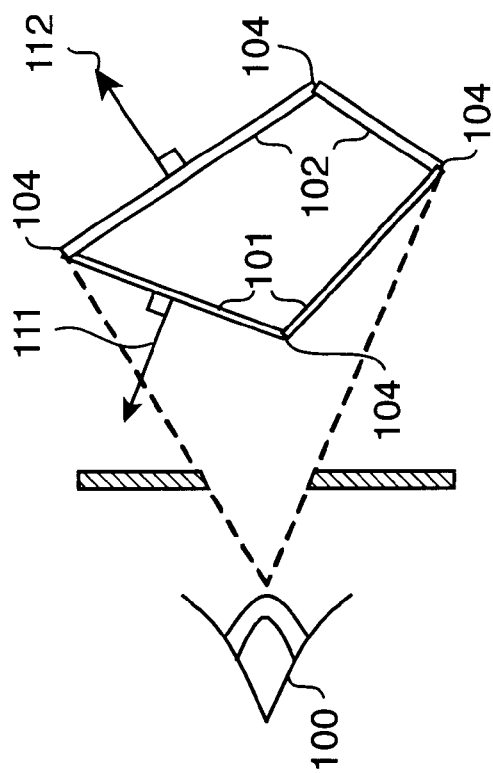
FIG. 1*a* is a side view of front-facing and back facing polygons.

As shown in FIGS. 1a–b for a particular point of view 100, my method identifies oriented polygons 101 and 102, respectively, in the polygon mesh being rendered. The polygons have vertices 104. I distinguish between front-facing polygons 101 and back-facing polygons 102 so that edges at silhouettes, ridges, valleys, and intersections can be accentuated. Whether or not a polygon is front- or back-facing depends, of course, on a particular point of view. In most simplistic terms, a normal 111 of the front-facing polygon 101 points towards the point-of-view, and a normal 112 points away.

In general, I generate at least one additional polygon at each edge of each polygon of the mesh. Typically, the additional polygon is black so that it will always stand out over any adjacent polygons, no matter their color (other than black) or textures.

The additional polygons have a predetermine orientation (dihedral angle) with respect to the polygon at the common edge. The orientation determines which of the various features is accentuated. The size can also be predetermined, in effect, the size controls the "width" of the accentuation. Minimally, the additional polygon, when projected onto the image plane should have a width of at least one pixel. The actual size can be user selected, larger polygons will give a greater amount of accentuation. High-lighting texture could be mapped to these additional polygons to improve the overall appearance of the geometric features of the scene or graphics object, although a solid black color should usually work well.

Silhouettes

As shown in FIG. 1b for back-facing polygons 102, the additional polygons 103 are arranged so that they appears around the projection of the adjacent front-facing polygon 101, if any. The additionally generated polygons 103 have vertices 105, as well as vertices on the common edge with the polygons 102. Here, the orientation of the additional polygons 103 is in the plane of the back-facing polygons. That is, one polygons as generated at 180° for each edge of each back-facing polygon.

Figure 2B:
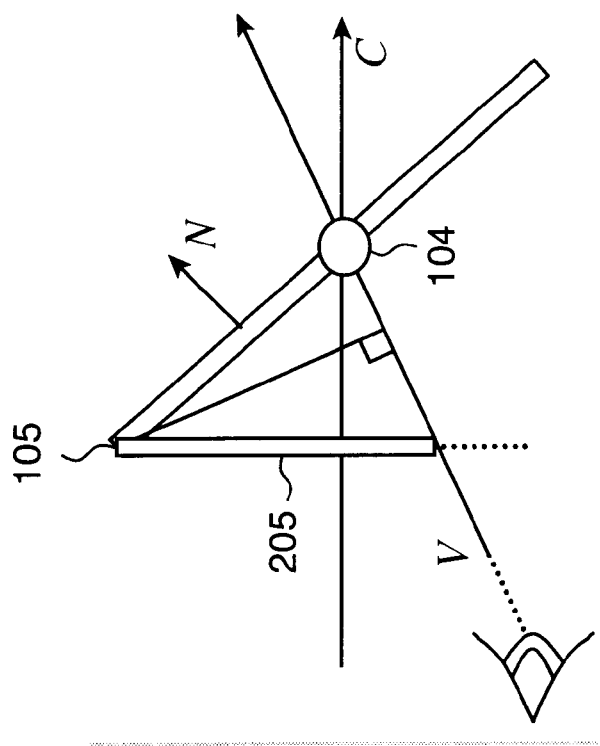
FIGS. 2*a–b* are side views of angles between polygons and viewing directions, and viewing axis and polygon orientations.
Figure 2A:
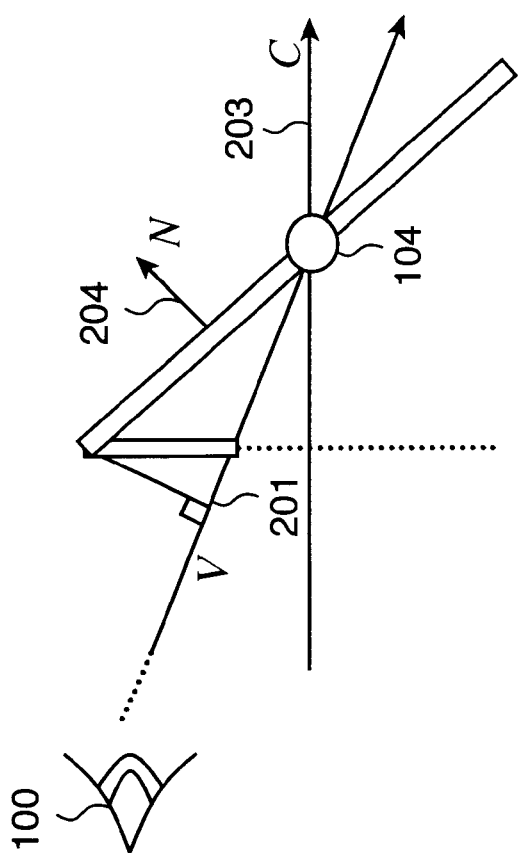

As shown in FIG. 2a, the size of each additional polygon 103, for a given width in image space, is dependent on its orientation N 204, and distance of the vertex 104, with respect to the point of view 100.

FIG. 2a shows an angle (V.C) between the view vector V 201, i.e., the direction from viewpoint 100 to a vertex 202 of the polygon, and a point of view axis vector C 203, and an angle (V.N) between the view vector and an orientation N 104 of the back-facing polygon 102 of FIGS. 1a–b. The size of the additional polygons 103, in this side view their heights, is proportional to $z(V.C)/(V.N)$, where z is a depth value of the vertex 104 with respect to the point of view. The angle (V.N) is commonly used during lighting calculations for highlights produced by specular reflectance for a local viewpoint. The angle (V.C) is constant for a given location in image space, and radially symmetric around the principal point. FIG. 2b shows the projection 205 of the additional polygons 103.

The orientation of the additional polygons 103, with respect of the view vector, is also dependent on the orientation of the edges of the back-facing polygons. If E is the edge vector, so that $\cos(\alpha)=V.E$, then the orientation of the additional polygons is $z \sin(\alpha).(V.C)/(V.N)$ in the direction E.N.

The silhouette edges can now be rendered at greater widths using the additional polygons 103. To further accentuate the appearance of the edges of the silhouette, clearly visible patterns can be applied to the additional polygons part 103 with texture mapping.

Ridges

To accentuate ridges, as shown in FIGS. 3a–d, I generate additional polygons at each edge of each front-facing polygon 101 so that ridges having a dihedral angle less than or equal to θ become visible. The orientation of the additional polygons is equal to the user specified dihedral angle θ 301. Usually, the dihedral angle means the angle between the normals of the two adjacent polygons 101. For simplicity of this description, the dihedral angle θ the interior angle between the adjacent front-facing polygons 101.

As shown in FIGS. 3b–c, I add polygons 302–303 at each edge of each front-facing polygon. The polygons 302-303 are oriented at angle θ with respect to the front-facing polygons. Whether or not the polygons are visibility can be determined using the depth values when the original and additional polygons are scan converted. As shown in FIG. 3d, only visible polygons 302 are visible. The rendering of the polygons 302 is done as described above for silhouettes.

When the dihedral angle of adjacent polygons is greater than θ, the added polygons are hidden by the neighboring front-facing polygons. The display of sharp ridges, where the threshold angle as well as the thickness of the rendered edge can be controlled by predetermined parameters, is thus possible in a single pass without providing connectivity information to the rendering engine, simply by processing one polygon at a time.

Valleys

As shown in FIGS. 4a–c, my method for rendering valleys is very similar to that of rendering ridges, because both are types of sharp edges defined by the threshold of a dihedral angle, in this case angle φ 401. Note, the angle φ can be different than the angle θ. Given a user selectable threshold angle φ, I accentuate a visible portion of the valley between two adjacent polygons having the common edge when the angle is greater less φ. Note, here, again for simplicity, the angle φ is external to the valley.

I add polygons 402 at an angle φ, at each edge of each front-facing polygon 101, as shown in FIG. 4b, so that the added polygons 402 appear in front of the adjacent front-facing polygons 101. This is exactly reverse of the situation for ridges.

As shown in FIGS. 5a–b, I can use two depth buffers, z1 501 and z2 502 to ensure that the additional polygons are properly rendered. The depth values in z2 are slightly larger than corresponding values in z1. In addition to the greater-than-test and less-than-test, I also perform a Boolean depth test, which I call an between-test. This test returns a true value when the depth value to be tested has a depth value between the corresponding values in z1 and z2, and false otherwise. Therefore, z2 should be at least two greater than z1. Thus, the additional polygon never updates the depth buffer and is displayed, i.e., the color buffer is updated, when the depth value satisfies the in-between test. This allows my invention to process all of the polygons, one at the time, in any order.

Intersections

Although intersections should not be encountered in quality graphics models, imprecise conversions or processing, or erroneous design parameters can result intersecting polygons. My procedure for accentuating intersections between two polygons for a given point of view is very similar to the procedure for accentuating valleys.

Figure 6:
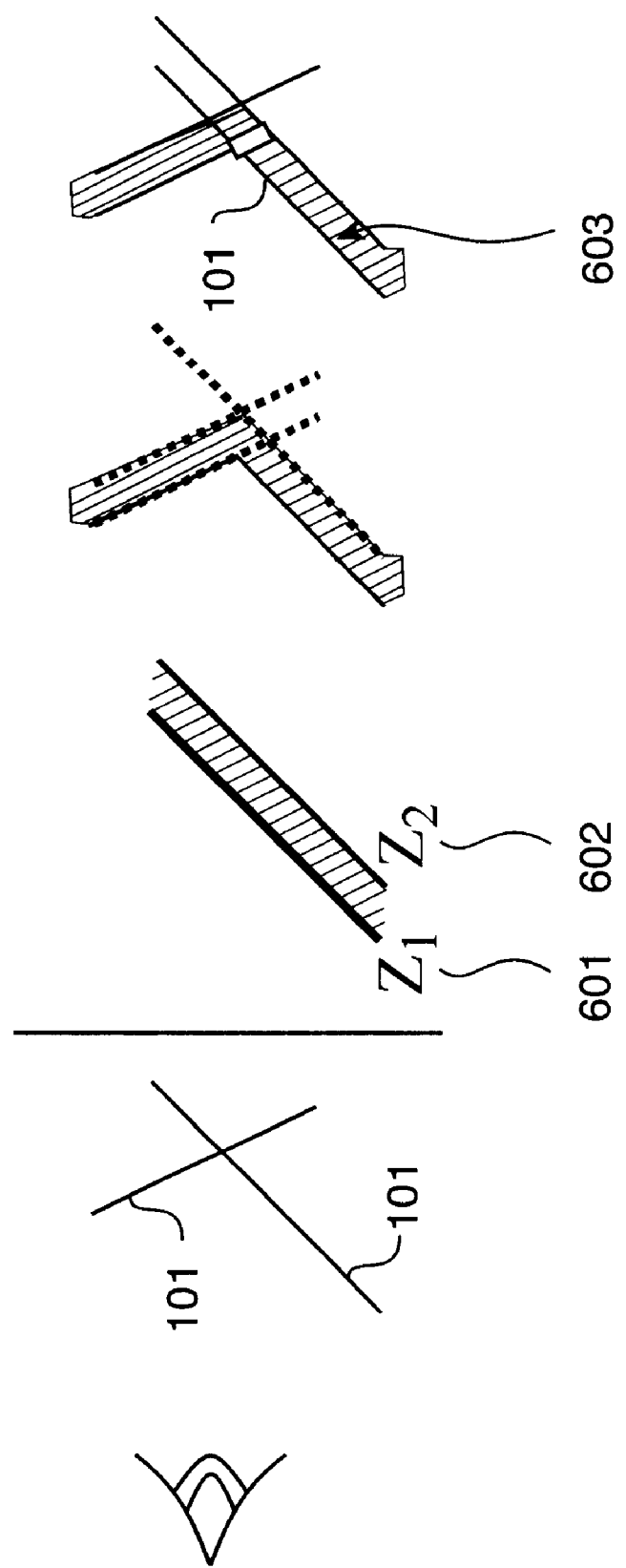

As shown in FIG. 6, during scan conversion, each fragment of each front-facing polygon is checked to see if it is in between z1 and z2 depth range 601–602. For a model with intersections or coplanar polygons, such fragments 603 will be trapped and rendered only when the fragments belong to a nearest front-facing polygon.

For systems that lack multiple depth buffers, the valleys and intersections can be rendered using one depth buffer and one stencil buffer during multiple rendering passes are used.

Figure 7:
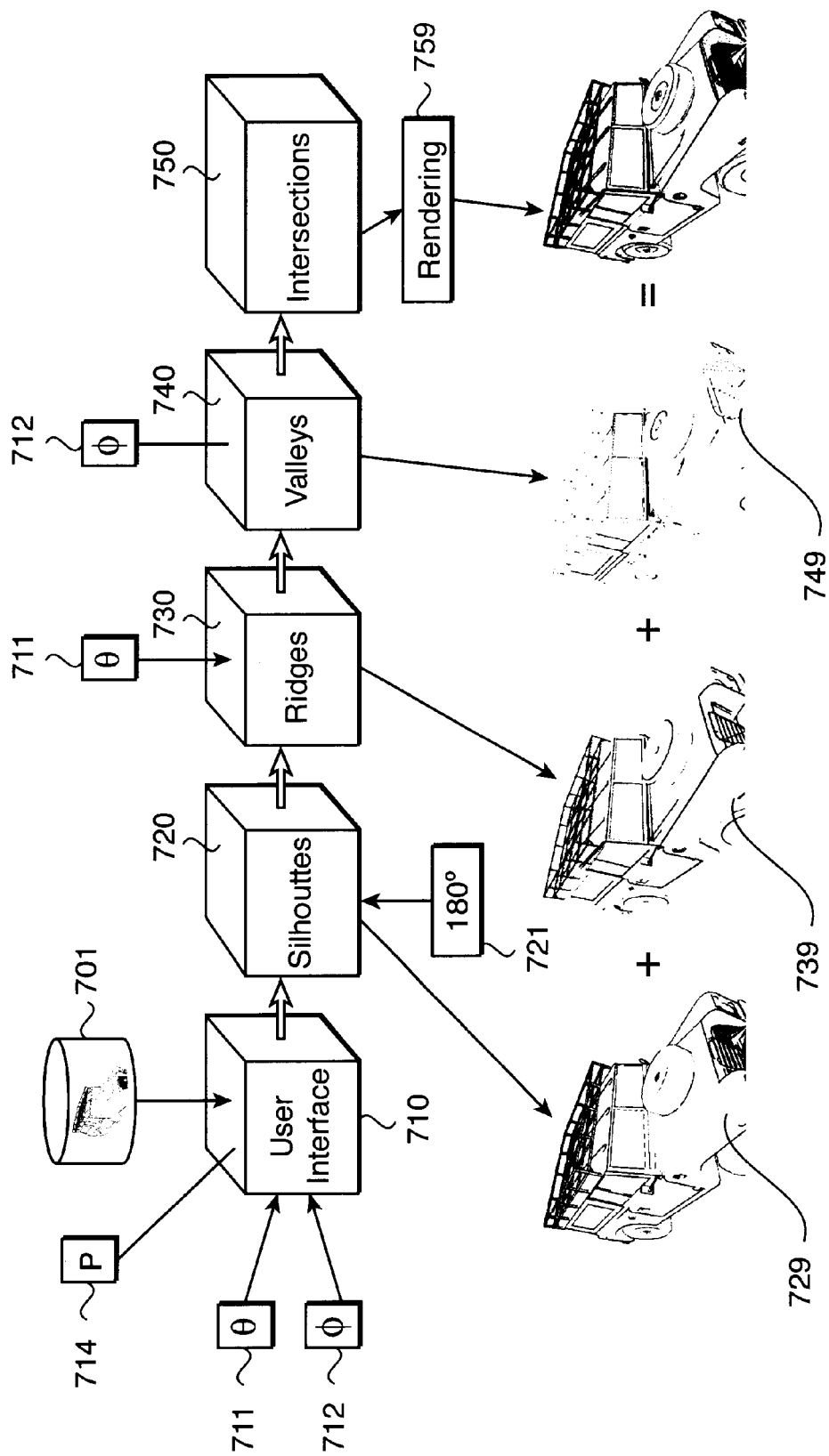
FIG. 7 is a block diagram of system according to the invention.

FIG. 7 shows a system 700 for rendering the special geometric features according to my invention. In step 710, the user supplies a polygon mesh 701 of a scene or a graphics object. The user also supplies the two threshold angles θ and φ 711–712, and rendering parameters P 713 that determine the size and appearance of added triangles.

In step 720, additional polygons are added at each edge of each back-facing polygon at an orientation of 180°, and according to parameters P 713 to accentuate silhouettes 729 in the polygon mesh 701.

In step 730, additional polygons are added at each edge of each front-facing polygon at an orientation of θ 711, and according to parameters 713 to accentuate ridges 739 in the polygon mesh. In step 740, additional polygons are added at each edge of each front-facing polygon at an orientation of φ, and according to parameters 713 to accentuate valleys 749 in the polygon mesh.

In step 750, each fragment of each front-facing polygon is checked during scan conversion to determine the fragment between a depth value z1 and a depth value z2, where z2 is slightly greater than z1 to determine whether the fragment is an interior intersecting portion 759 of intersecting polygons. If so, the fragment is rendered according to parameters 714. The combined rendering 759 accentuates silhouettes, ridges, valleys, and intersections.

The method described above lead to a method that can identify and render special geometric features of polygon meshes of scenes and graphics models without explicitly identifying the edges that form these features. Furthermore, my method allows polygons to be processed one at the time, without time-consuming preprocessing, or computing connectivity information. Thus, my invention, can render dynamic scenes with just a single traversal of the scene graph or triangle list.

My invention, improves the appearance of static and dynamic images by adding polygons at visible portions of edges that correspond to the special features using only local information, i.e., the edges and orientation of individual polygons.

The method according to the invention is particularly suited for hardware rendering engines, such as game consoles, because these devices can interactively generate many triangles without increasing processing time. In hardware implementations, the number of polygons in a scene is less of an issue, and hence the present method does not significantly burden the graphics pipeline. The main problems in current 3D graphics chips are bandwidth and fill rate. The present invention generates simple geometric primitives, e.g., black polygons, and does not need to use textures, and hence avoids running into problems with bandwidth, or fill rate.

The present invention can be used commercial modeling and rendering packages such as CAD/CAM, Alias, or 3D Studio Max. The method can also be used with real-time rendering interfaces such as Direct3D and OpenGL.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

I claim:

1. A method for rendering a mesh including a plurality of polygons representing a graphics model, comprising:

generating at least one additional polygon at each edge of each polygon of the mesh, each additional polygon having a predetermined orientation, size, and color; and rendering the plurality of polygons of the mesh and the additional polygons to accentuate geometric features of the graphics model.

2. The method of claim 1 wherein the predetermined orientation of the generated polygons is 180° with respect to the polygon if the polygon is a back-facing polygon to accentuate silhouettes.

3. The method of claim 1 wherein the predetermined orientation of the generated polygon is a first threshold angle with respect to the polygon if the polygon is a front-facing polygon to accentuate ridges.

4. The method of claim 1 wherein the predetermined orientation of the generated polygon is a second threshold angle with respect to the polygon if the polygon is a front-facing polygon to accentuate valleys.

5. The method of claim 4 wherein depth values of all of the polygons are maintained in a first z-buffer and a second z-buffer having depth values greater than the first z-buffer, and further comprising:

updating depth values of first depth buffer only if the depth values of the generated triangles are in between the depth values of the first and second depth buffers.

6. The method of claim 5 further comprising:

determining whether a fragment of a particular front-facing polygon has depth values between depth values in the first z-buffer and the second z-buffer, and rendering the fragment only if the particular front-facing polygon is a nearest polygon to a point of view to determine intersecting polygons.

7. The method of claim 1 wherein the predetermined orientation of the generated polygon at each is 180° with respect to the polygon if the polygon is a back-facing polygon to accentuate silhouettes, wherein the predetermined orientation of a first generated polygon at each edge is a first threshold angle with respect to the polygon if the polygon is a front-facing polygon to accentuate ridges, and wherein the predetermined orientation of a second generated polygon at each edge is a second threshold angle with respect to the polygon if the polygon is the front-facing polygon to accentuate valleys.

8. The method of claim 1 wherein a width of the generated polygons is at least one pixel.

9. The method of claim 1 wherein the color of the generated polygons is black.

10. The method of claim 1 wherein depth values of all of the polygons are maintained in a first z-buffer and a second z-buffer having depth values greater than the first z-buffer, and further comprising:

updating depth values of the first depth buffer only if the depth values of a particular fragment of a front-facing polygon are between the depth values of the first and second depth buffers.

11. The method of claim 1 further wherein the polygons are processed one at the time in a rendering engine while generating the additional polygons.

* * * * *